(12) United States Patent
Massmann et al.

(10) Patent No.: US 7,996,850 B2
(45) Date of Patent: Aug. 9, 2011

(54) DYNAMIC BUSINESS OBJECT PROPERTIES FOR SOA ARCHITECTURES

(75) Inventors: Silke Massmann, Heidelberg (DE);
Otfried Von Geisau, Sinsheim (DE);
Ralph Rillig, Mutterstadt (DE);
Andreas Huppert, Neulussheim (DE);
Michael Meyringer, Rauenberg (DE)

(73) Assignee: SAP AG, Walldorf (DE)

( * ) Notice: Subject to any disclaimer, the term of this patent is extended or adjusted under 35 U.S.C. 154(b) by 903 days.

(21) Appl. No.: 11/648,404

(22) Filed: Dec. 28, 2006

(65) Prior Publication Data
US 2008/0163253 A1 Jul. 3, 2008

(51) Int. Cl.
*G06F 3/00* (2006.01)
*G06F 15/16* (2006.01)

(52) U.S. Cl. ........ 719/320; 719/313; 719/316; 719/328; 709/228; 709/246

(58) Field of Classification Search .................. None
See application file for complete search history.

(56) References Cited

U.S. PATENT DOCUMENTS

| 7,050,056 B2 | 5/2006 | Meyringer | |
|---|---|---|---|
| 2006/0195471 A1* | 8/2006 | Newport | 707/103 Z |
| 2008/0010387 A1* | 1/2008 | Curtis et al. | 709/246 |

* cited by examiner

*Primary Examiner* — Andy Ho
*Assistant Examiner* — Tuan Dao
(74) *Attorney, Agent, or Firm* — Fish & Richardson P.C.

(57) ABSTRACT

This disclosure involves dynamic business object properties for Enterprise Service Architecture (ESA) or other Service Oriented Architecture (SOA) architectures. For example, a method for dynamically modifying an interface in a SOA can comprise receiving a request for an interface associated with a business object, where the interface includes a plurality of fields configured to receive information from a client. The method can further identify current values of one or more attributes associated with the business object and dynamically modify at least one of the fields of the interface based, at least in part, on one or more of the current values.

20 Claims, 6 Drawing Sheets

DYNAMIC BUSINESS OBJECT PROPERTIES FOR SOA ARCHITECTURES

TECHNICAL FIELD

This invention relates to Enterprise Service Architecture (ESA) or Service Oriented Architecture (SOA) and, more particularly, to dynamic business object properties for ESA or SOA architectures.

BACKGROUND

Generally, field properties or attributes can only be controlled on the user interface level in business applications. Field control (FC) for APIs or web services is often hard-coded or configured separately. This can increase costs and cause inconsistencies. With ESA architectures, the same APIs are often used for UI, A2A, and web services. Because no common service exists today, applications moving to ESA might be forced to implement their own solutions.

SUMMARY

This disclosure involves dynamic business object properties for Enterprise Service Architecture (ESA) or other Service Oriented Architecture (SOA) architectures. For example, a method for dynamically modifying an interface in an ESA can comprise receiving a request for an interface associated with a business object, where the interface includes a plurality of fields configured to receive information from a client. The method can further identify current values of one or more attributes associated with the business object and dynamically modify at least one of the fields of the interface based, at least in part, on one or more of the current values. For example, declarative based constraints can be determined at design time in decision table, formula editor, or other tool that implement rules maintained by a user. This table can be issued so that properties can be determined dynamically based on business object status, user, actions, and such.

Moreover, some or all of these aspects may be further included in respective systems or other devices for executing, implementing, or otherwise supporting a software application that can create instances of the class within the framework with varying attributes. The details of these and other aspects and embodiments of the disclosure are set forth in the accompanying drawings and the description below. Other features, objects, and advantages of the various embodiments will be apparent from the description and drawings, as well as from the claims.

DETAILED DESCRIPTION

Figure 1:
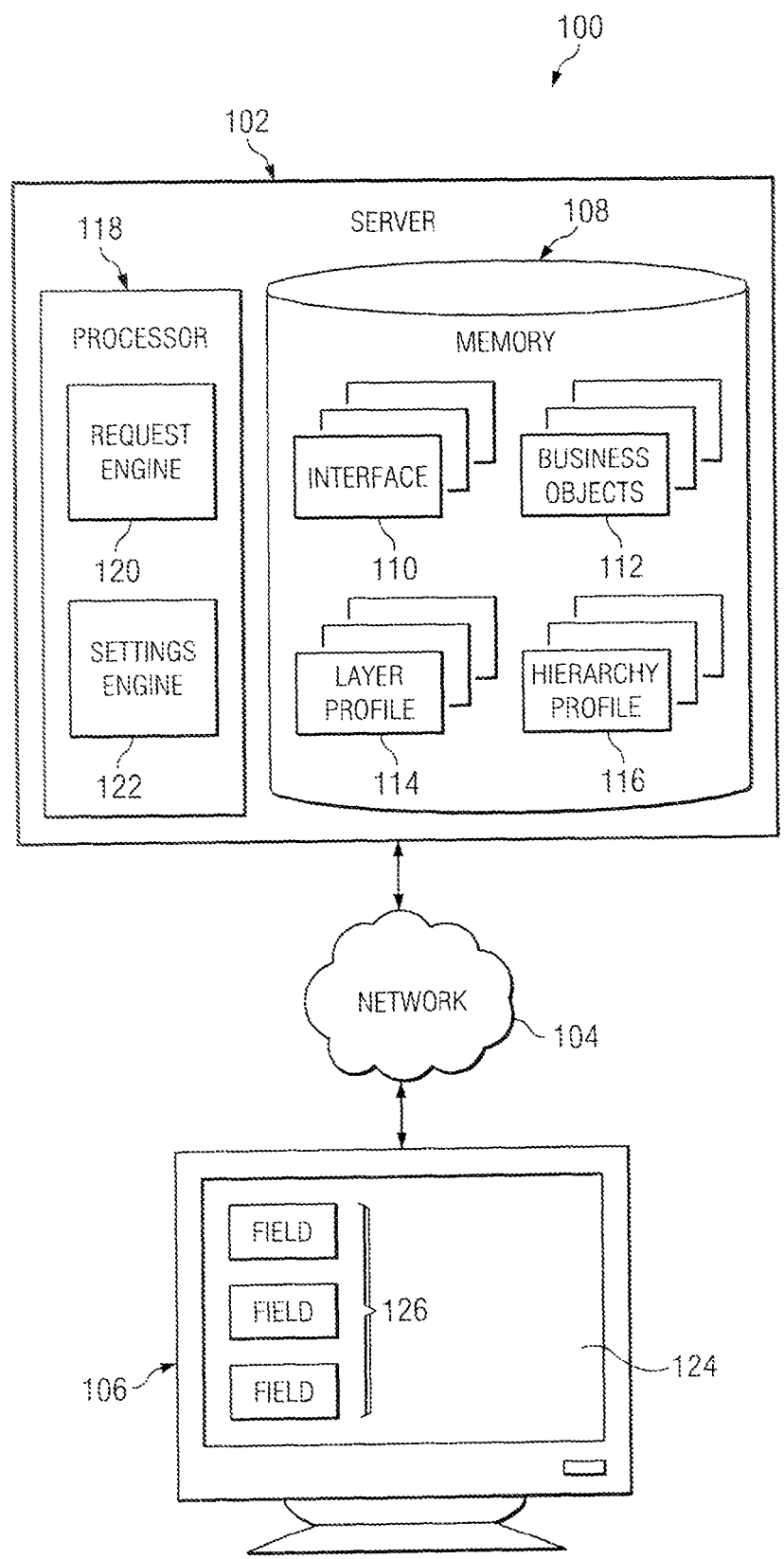
FIG. 1 illustrates an example system for configuring and determining properties for fields in a Service Oriented Architecture (SOA) environment.

FIG. 1 illustrates an example system 100 for configuring and determining properties for fields, actions, associations, and nodes contained within business objects (BOs) in a layered Enterprise Service Architecture (ESA) environment, often termed a Service Oriented Architecture (SOA). For example, when automatically generating an input user interface for a business object, the system 100 may attach properties to a field of the business object and use those properties to control the generation of the particular user interface. For example, the field of the business object may have a property indicating that the field is read-only. The generated user interface may then include a control that does not allow the user to change the field value. The control may also include visual cues that indicate that the field value is not changeable. As another example, if a field of the business object has a property indicating that the field is mandatory, the user interface may contain code that aborts a save function in the case that the field is not entered. Properties may be used for other reasons than automatically generating a user interface. The examples presented here are not intended to limit the scope of this disclosure in any way.

In addition, the property of the field of the business object may be categorized as dynamic or static. A dynamic property may be changed while the system 100 is running. For example, the field may have a dynamic property that marks it as mandatory only when another field is set to a certain value. In another example, if the user interface fails to acquire a lock on the business object, as may happen when another user is already editing the business object, all of the fields in the business objects may have a property dynamically set to read-only.

In a further addition, the business object may have been modified from its original version, for example, by a separate business unit of the software provider, by a customer of the software provider, or any other (perhaps authenticated) party or layer. Additional fields may be added to the business object during modification. Properties of fields contained within the business object may be changed. The static properties of a field may be specified when the system is being designed, and included in the code or configuration of the system. The specification may be accomplished with the example user interface of FIG. 5. Of course, other methods of specifying the properties are possible. The static properties of a field may be stored in the system 100. If a business object has been modified in multiple different layers, multiple static properties may be stored.

Fields may be grouped into field groups are generally logically packages of fields that expose the same behavior. For example, the field group may also contain properties. Such properties contained in the field group may represent default properties for the grouped fields. Alternatively, the properties of the field group may override the properties of the grouped fields.

A reuse component field control may be used to determine the properties of a field of a business object at runtime. The dynamic properties may be evaluated by a formula and derivation tool. The default static properties (supplied by an original developer of the business object) may be compared to static properties, if any exist, supplied by a developer of the modified business object, and to the dynamic properties that were determined at runtime. The most restrictive of the properties for a given field of the business object may be selected for the runtime property. The field control may also maintain field groups Referring to illustrated FIG. 1, the system 100 is distributed or a hosted solution on a remote server 102 providing various business processes and functionality. In this case, portions of the hosted solution may be developed by a first entity, while other components are developed by a second entity. These entities may participate in any suitable form of revenue or cost sharing as appropriate. Moreover, the processes or activities of the hosted solution may be distributed amongst these entities and their respective components. Accordingly, system 100 may implement a suite of tightly integrated products that provide a solution to configure static field properties while the system is being designed and determine dynamic properties at run-time. System 100 is typically a distributed client/server system that spans one or more networks such as 104 and implements any number of layers. There may be any number layers within a system. One way to define a layer is to group changes made by an organization, for example a business unit within the software provider's organization, or a customer of the software provider. Other ways of defining a layer are also possible. Layers may be hierarchical. The business object may be modified in many layers or may be unmodified in some layers. Layers may be represented explicitly or implicitly in the system 100. In such embodiments, data may be communicated or stored in an encrypted format such as, for example, using the standard TNG encryption algorithm. This encrypted communication may be between the user and the host or amongst various components of the host. Further, system 100 may store data (user, transaction, service provider, and such) at a relatively central location (over WAN), while concurrently maintain local data at the user's site for redundancy and to allow processing during downtime. But system 100 may be in a dedicated enterprise environment—across a local area network (over LAN) or subnet—or any other suitable environment without departing from the scope of this disclosure.

Turning to the illustrated embodiment, system 100 includes or is communicably coupled with server 102 and one or more clients 106, at least some of which communicating across network 104. Server 102 comprises an electronic computing device operable to receive, transmit, process and store data associated with system 100. Generally, FIG. 2 provides merely one example of a system that may be used with the disclosure. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server.

Illustrated server 102 includes memory 108. Memory 108 may include any memory or database module and may take the form of volatile or non-volatile memory including, without limitation, magnetic media, optical media, random access memory (RAM), read-only memory (ROM), removable media, or any other suitable local or remote memory component. Illustrated memory 108 includes interface 110, business objects 112, layer profiles 114 and hierarchy profiles 116. But memory 108 may also include any other appropriate data such as a field control registry, VPN applications or services, firewall policies, a security or access log, print or other reporting files, HTML files or templates, child software applications or sub-systems, and others.

Illustrated interface 110 communicates with other computer systems, such as clients 106, over network 104 in a client-server or other distributed environment. In certain embodiments, server 102 receives data from internal or external senders through interface 110 for storage in memory 108 and/or processing by processor 118. Generally, interface 110 comprises logic encoded in software and/or hardware in a suitable combination and operable to communicate with network 104. More specifically, interface 110 may comprise software supporting one or more communications protocols associated with communications network 104 or hardware operable to communicate physical signals.

The overall structure of a business object model ensures the consistency of the interfaces that are derived from the business object model. The derivation ensures that the same business-related subject matter or concept is represented and structured in the same way in all interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

A business object 112 is a capsule with an internal hierarchical structure, behavior offered by its operations, and integrity constraints. Business objects 112 are semantically disjoint, i.e., the same business information is represented once. In the business object model, the business objects 112 may be arranged in an ordering framework (not shown). From left to right, they may be arranged according to their existence dependency to each other. For example, the customizing elements may be arranged on the left side of the business object model, the strategic elements may be arranged in the center of the business object model, and the operative elements may be arranged on the right side of the business object model. Similarly, the business objects may be arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure. Data types are used to type object entities and interfaces with a structure. This typing can include business semantics. For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects 112 and interfaces 110, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model. Entities are discrete business elements that are used during a business transaction. Entities are not to be confused with business entities or the components that interact to perform a transaction. Rather, "entities" are one of the layers of the business object model and the interfaces 110. For example, a Catalogue entity is used in a Catalogue Publication Request and a Purchase Order entity is used in a Purchase Order Request. These entities are created using the data types defined above to ensure the consistent representation of data throughout the entities.

Fields within a business object 112 may be described by one or more properties. The property may take on the value of "mandatory". A property value of mandatory may indicate that the value for the field is typically entered or the business object node cannot be saved in a consistent state. The property may take on the value of "read-only". A property value of read-only may indicate that the value of the field cannot be changed by the service consumer. The property may take on the value of "input-field". A property value of input-field may indicate that the value of the field may be changed by the service consumer. The property may take on the value of "disabled". A property value of disabled may indicate that the field is not relevant in the current business context and is not relevant for any service consumer. This list of property values is not exhaustive. The property values listed here are descriptive rather than definitive. In some implementations other values may be used to represent the same concepts. For example, the mandatory property value may be represented by "M", or some other value. In the ESA environment, the field property information (such as Mandatory, Read-Only, Input field and Disabled) may be coded through different combinations of three indicators (Enabled, Mandatory, Read-Only). In this example, possible action properties might be "ENABLED" or "DISABLED", which generally mean that the action can be invoked or is disabled. Possible association properties are "CREATE_ENA", "CREATE_DIS" or "DISABLED". In particular this means:

Create_enabled: The target node of the association can be created along this association. The association itself will be set to enabled, thus navigation via this association is possible.

Create_Disabled: The target node of the association can not be created along this association. But the association itself will be set to enabled, thus navigation via this association is still possible.

Disabled: Neither navigation via this association nor creation along this association is possible.

These example association property values can be transformed into ESA Properties.

Further, illustrated memory 108 includes layer profiles 114. Layer profiles 114 may contain information settings for each layer. A layer may represent a level of customization of the software package. For example, the base layer may be the software that is created by a software provider. A globalization layer may include language dependant software. A customer layer may include customizations of the software made by a client. Each layer profile may contain property information about the fields of the business objects 112. Alternative layering schemes are possible. Illustrated memory 108 includes hierarchy profiles 116. Hierarchy profiles 116 may contain information relating to a hierarchy of layers. Superior layers may represent additional customization of inferior layers. Properties of a field defined in an inferior layer may be restricted in a superior layer. The runtime properties of a field may be determined by comparing the properties of the fields from each layer and selecting the properties of the highest hierarchical layer of the business object.

Server 102 also includes processor 118. Processor 118 executes instructions and manipulates data to perform the operations of server 102 such as, for example, a central processing unit (CPU), a blade, an application specific integrated circuit (ASIC), or a field-programmable gate array (FPGA). Although FIG. 1 illustrates a single processor 118 in server 102, multiple processors 118 may be used according to particular needs and reference to processor 118 is meant to include multiple processors 118 where applicable. In the illustrated embodiment, processor 118 executes request engine 120 and settings engine 122, perhaps referred to collectively as a rule engine (such as in example FIG. 2B).

The illustrated request engine 120 manages the input and output of the server 102. When a client 106 makes a request of a business object 112 located on the server 102, the request engine 120 may operate to identify the specific business object 112, and dispatch the request to application logic that handles the request. In some embodiments, the request engine 120 may query the settings engine 122 to determine the runtime properties of the fields of the business object. For example, an application for managing purchase orders running on the client 106 may send a purchase order request to the server 102. The illustrated request engine 120 may receive the purchase order request, locate an application (not shown) that is configured to handle the request, and dispatch the request to the application. The request engine 120 may also perform other tasks, which are not disclosed here.

At a high level, the illustrated settings engine 122 is operable to receive and/or process requests for the properties of a field from a user or software application and present at least a subset of the results to the particular user or application. More specifically, the settings engine 122 operates at design time to retrieve the property of a specific field from the layer profile 114, and to save said property to the layer profile. The settings engine 122 also operates at run-time to determine the property of a specific field from the layer profile 114 and hierarchy profile 116. Returning to the purchase order example, the example purchase order request may include fields that have properties that are to be evaluated at run-time. The illustrated request engine 120 may query the illustrated settings engine 122 for said properties.

Regardless of the particular implementation, "software" may include software, firmware, wired or programmed hardware, or any combination thereof as appropriate. Indeed, request engine 120 and settings engine 122 may be written or described in any appropriate computer language including C, C++, Java, Visual Basic, assembler, Perl, any suitable version of 4GL, as well as others. For example, returning to the above described composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's NET. It will be understood that request engine 120 and settings engine 122 may include numerous sub-modules or each may instead be a single multi-tasked module that implements the various features and functionality through various objects, methods, or other processes. Further, while illustrated as internal to server 102, one or more processes associated with request engine 120 or settings engine 122 may be stored, referenced, or executed remotely. For example, a portion of settings engine 120 may be a web service that is remotely called, while another portion of settings engine 122 may be an interface object bundled for processing at remote client 106. In another 122, the majority of processes or modules may reside—or processing take place—on client 106. Moreover, request engine 120 or settings engine 122 may be a child or sub-module of another software module or enterprise application (such as the rules engine) without departing from the scope of this disclosure.

The respective software may implement various classes to achieve some or all of the functionality described herein. For example, an Entity Collection class could be an abstract class and used as a superclass for collections of subordinate application objects. Class Entity Collection encapsulates program logic to support loading of single entity instances without instantiation of the parent entity. This class may include the following example public and protected methods:

Constructor—Generally expects the key of the hosting entity, the reference to the responsible Persistency-object and information, weather the hosting entity was new created.

After_Commit—Is typically redefined in the specific Collection in order to replace the BeforeImage with the current data. The method is called from the After_Commit-method of the Persistency-object Set_Complete—Can set the completion state of the collection.

Free—Destructor. Removes the instance from the static collection.

In another example, an example entity class is an abstract class that is used as superclass by each application object. Class Entity encapsulates the program logic to handle creation, change and deletion of entities together with a persistency object, which has also to be implemented by each application object (entity type). It is assumed that an entity is always identified by an individual key. This class may include the following example public and protected methods:

Constructur—Can expect a structure as data import parameter; this is in general the database table the entity is persisted in.

Get_Edit_Mode (abstract)—Can return the edit mode of the entity. If the entity is lockable the edit mode is typically determined from its own enqueue state. Otherwise the implementation would call the corresponding method of its hosting entity.

Get_Key (abstract)—Can return the key of the entity.

Get_Persistency (abstract)—Can return the instance of the responsible persistency object for the entity.

Get_State—Can return the state of the object.

Set_Edit_Mode (abstract)—The implementation tries to arrange a more severe edit mode—it may not set a less severe edit mode. If the entity is not lockable itself, the method call is forwarded to the hosting entity. The implementation obtains in case that the entity is reloaded from the database by the persistency object. Can raise an exception if another user locks the entity.

After_Commit—Method gets called from the responsible persistency object in the After_Commit phase. Can set the state to Loaded; is typically redefined in subclasses—implementation can move current attributes into the Before_Image.

Free—Destructor of the object; can clear/free attributes and references for the garbage collector is able to free memory; is also responsible to remove itself from collections of the responsible persistency and collection object; usually is typically redefined in subclasses.

Notify_Change—A subclass can call this method to communicate changes of the entity to the responsible persistency object.

Notify_Creation—A subclass can call this method to communicate creation of the entity to the responsible persistency object.

Notify_Deletion—A subclass can call this method to communicate deletion of the entity to the responsible persistency object.

Notify_Load—A subclass can call this method to communicate loading and reloading (reconstruction) of the entity to the responsible persistency object.

_Get_Data—Can return a reference to the current data. The subclass can use this data reference to apply modifications to the attributes of the entity. It is explicitly allowed to store this reference in a (private) typed member variable of the subclass—Entity guarantees that the reference remains stable and points always to the same data structure. The data reference may remain private/protected within the subclass. The subclass may declare at least one public method Get_Data, which returns a typed data structure (possibly containing only a subset of attributes).

_Get_Data_Before_Image—Can return a reference to a data image with original values (as passed to constructor/reconstruct method). The subclass may not store this data reference—the reference is not stable and may point to another data structure after the next change. The data reference may remain private/protected within the subclass. The subclass may declare a public method Get_Data, which returns a typed data structure.

_Reconstruct—Reconstructs an entity with state 'Loaded' or 'Invalid' with current data (loaded from the database). Can expect a structure (database table) as data import parameter. The type of the passed structure is typically the same as the structure passed to the constructor. The subclass may declare a Reconstruct-method with an typed import structure, which is called from the corresponding persistency object. The implementation of the Reconstruct-method may call the _Reconstruct-method; it can call also the Notify_Load-method.

Persistency is an abstract class, which is used as superclass by each persistency object. A persistency object is typically implemented by each application object (entity type) as singleton. The persistency object stores references to instantiated, created, changed and deleted entities. The constructor registers the persistency object at the persistency manager. This class may include the following example public and protected methods:

Constructor—Can register itself at persistency manager.

Read_Buffered_Entity—Can return the entity with passed key from the buffer. Can raise an exception if the entity is not buffered (does not load from the database).

After_Commit—Can correspond to the identically named method of the ESI transaction provider method. Calls the corresponding method of each created and changed entity. Calls the Free-method of each deleted entity.

Cleanup—Can correspond to the identically named method of the ESI transaction provider method. Calls the Free-method of each entity in the buffer.

Notify_Change—Can receive a change notification from an entity—collects changed entities.

Notify_Creation—Can receive a creation notification from an entity—collects created entities and adds it to the buffer.

Notify_Deletion—Can receive a deletion notification from an entity—collects deleted entities.

Notify_Load—Can receive a load notification from an entity—adds entity to the buffer.

Save (abstract)—Can correspond to the identically named method of the ESI transaction provider method. Is typically read data from the created, changed and deleted entities and make modifications persistent.

Persistency Manager is implemented as a singleton. It is single access point to control the transactional behavior and stores references to instantiated persistency objects. It provides necessary methods for the implementation of an ESI transaction provider and forwards these method calls to registered persistency objects. This class may include the following example public and protected methods:

After_Commit—Can correspond to the identically named method of the ESI transaction provider method. Forwards the method call to registered persistency objects.

Cleanup—Can correspond to the identically named method of the ESI transaction provider method. Forwards the method call to registered persistency objects.

Flush_Enqueue—Can execute queued enqueue requests. Tries a collective flush to the enque server; if failed, single enqueue calls are processed. Notifies the enqueue objects about a successful flush.

Get_Enqueue_Object—Can return the registered enqueue object for the given EnqName and entity Key—the constructor of Enqueue Object registers itself at the PersistencyManager. Can raise an exception if there is no corresponding enqueue object registered.

Get_Instance—Can return an instance of the class—creates a new one, if no instance exists yet.

Save—Can correspond to the identically named method of the ESI transaction provider method. Forwards the method call to registered persistency objects.

Enqueue Object is an abstract class, which is used as superclass for entity type specific enqueue objects. Subclasses (specific enqueue objects) have to implement a constructor and methods Request_Enqueue and Request_Dequeue, which encapsulate the call of the enqueue and dequeue function module. Enqueue Object provides together with the Persistency Manager generic functions to flush collective enqueue requests and control the lock state of an entity. This class may include the following example public and protected methods:

Constructor—Can expect the name of the DDIC enqueue object and the key of the requesting entity. Stores the provided parameters and registers itself at the PersistencyManager.

Create_Lock—Calls method Request_Enqueue to obtain a lock with exclusive lock mode. If the collect indicator parameter is set, the collected enqueue requests is typically flushed by calling the corresponding method of the PersistencyManager.

Free—Destructor. Can delete current locks (calls Request_Dequeue) and unregisters from Persistency Manager Get_Enq_Name—Can return the provided name of the DDIC enqueue object.

Get_Key—Can return the provided key of the requesting entity.

Get_Mode—Can return the current lock mode—this is usually the requested lock mode. The lock mode is initial, if a collective enqueue was not yet flushed or the requested enqueue failed.

Request_Enqueue (abstract)—Is typically implemented in the subclass and call the enqueue function module with provided parameters.

Request_Dequeue (abstract)—Is typically implemented in the subclass and call the dequeue function module with provided parameters.

Class Cl_FCL_BO_Nodes is the collection object for BO Node. It is responsible to retrieve and create BO Node instances. This class may include the following example public and protected methods:

Constructor—Can add reference to itself to buffer of collection instances and registers itself at the persistency object to take part on the next database select.

Create_BO_Node—Creates a new BO Node instance.

Get_By_Key—Static method returns the BO Node instance for the provided key. If iv_single is true only data for provided key is loaded from database. Otherwise the whole collection is loaded.

Get_Instance—Can return a collection instance for the provided caller and BO name. Tries to read an existing instance from its static collection instances table and returns it if successful; creates a new instance otherwise. Can raise an exception if caller or BO name is initial.

Class Cl_FCL_BO_Node can extend Cl_FCL_Entity and represents the entity BO Node using example redefined methods:

Get_Edit_Mode—Can return current edit mode.

Get_Key—Can return key.

Get_Persistency—Can return persistency object.

Set_Edit_Mode—Tries to lock BO Node if exclusive edit mode is requested. This includes reloading entity from database.

Free—Destructor. Frees existing locks, removes itself from collection and calls corresponding method of the superclass.

Its own methods may include:

Constructor—Can set default attributes and adds itself to collection. Creates a lock if iv_new is true.

Delete—Can delete the BO Node instance and corresponding Field Groups and Functions.

Get_BO_Name—Can return BO Name

Get_Data—Can return the current and before image data.

Set_Data—Can set basic data.

Class Cl_FCL_BO_Node_P can extend Cl_FCL_Persistency and is the persistency object (implemented as Singleton) of BO Node. The constructor of collection BO Nodes registers itself at the persistency object—the persistency object takes registered collections into account at the next database select. The class can use the following example redefined methods:

Save—Can update the database.

Its own methods may include:

Get_Instance—Can return an instance of the class—creates a new one, if no instance exists yet (Singleton).

Class Cl_FCL_BO_Node_Enqueue extends Cl_FCL_Enqueue_Object and controls the lock state of a BO Node. Locking strategy is always exclusive but not cumulative. The class can use the following example redefined methods:

Create_Lock—Tries to lock corresponding Functions in FDT. If succeeded calls corresponding method of the superclass.

Free—Destructor. Dequeues Functions in FDT and calls corresponding method of the superclass.

Request_Dequeue—Calls the dequeue function module.

Request_Enqueue—Calls the enqueue function module.

Class Cl_FCL_Field_Groups can extend Cl_FCL_Entity_Collection and is the collection object for Field Group. It is responsible to retrieve and create Field Group instances. The class can use the following example redefined methods:

After_Commit—Performs actions after successful commit work

Free—Destructor. Calls corresponding method of the superclass. Frees member attributes and unregisters from the persistency object, if not yet completed.

Set_Complete—Can set the completion state of the collection

Its own methods may include:

Constructor—Can add reference to itself to buffer of collection instances. If parameter Iv_New is false, registers itself at the persistency object to take part on the next database select.

Create_Field_Group—Can request hosting BO Node in exclusive edit mode and creates a new Field_Group instance.

Get_All—Can return a table with Field_Group instances associated to the hosting BO Node. Parameter Iv_Request_Before_Image controls, whether the state as existed before start of the current transaction is retrieved.

Get_BO_Node—Can return the hosting BO Node instance.

Get_By_Guid—Static method returns the Field_Group instance for the provided GUID.

Get_Instance—Can return a collection instance for the provided BO Node Key. Tries to read an existing instance from its static collection instances table and returns it if successful; creates a new instance otherwise. Can raise an exception if BO Node Key is initial (does not check the existence of the BO Node).

Class Cl_FCL_Field_Group can extend Cl_FCL_Entity and represents the entity Field Group. A Field Group is locked by the hosting BO Node. The class can use the following example redefined methods:

Get_Edit_Mode—Can return edit mode of hosting BO Node.

Get_Key—Can return GUID.

Get_Persistency—Can return persistency object.

Set_Edit_Mode—Can lock hosting BO Node if exclusive edit mode is requested.

Free—Destructor. Removes itself from collection and calls corresponding method of the superclass.

Its own methods may include:

Constructor—Can set default attributes and adds itself to collection.

Delete—Can delete the Field Group instance and corresponding Field Group Assignments.

Get_BO_Name—Can return BO name.

Get_Data—Can return the current and before image data.

Set_Data—Can set basic data.

Class Cl_FCL_Field_Group_P can extend Cl_FCL_Persistency and is the persistency object (implemented as Singleton) of Field Group. The constructor of collection Field Groups registers itself at the persistency object—the persistency object takes registered collections into account at the next database select. The class can use the following example redefined methods:

Save—Can update database.

Its own methods may include:

Get_Instance—Can return an instance of the class—creates a new one, if no instance exists yet (Singleton).

Load—Can load the Field Group instances for the provided Field Groups collection (all Field Groups of a BO Node). Calls the Set_Complete-method for the collection.

Load_By_Guids—Can load the Field Group instances for the provided GUIDs.

Register_Load—Register a collection to take part on next database select.

Unregister_Load—Unregister a collection from taking part on next database select Class Cl_FCL_Field_Group_Assignments can extend Cl_FCL_Entity_Collection and is the collection object for Field Group Assignment. It is often responsible to retrieve and create Field Group Assignment instances. The class can use the following example redefined methods:

After_Commit—Performs actions after successful commit work

Free—Destructor. Calls corresponding method of the superclass. Frees member attributes and unregisters from the persistency object, if not yet completed.

Set_Complete—Can set the completion state of the collection

Its own methods may include:

Constructor—Can add reference to itself to buffer of collection instances. If parameter Iv_New is false, registers itself at the persistency object to take part on the next database select.

Create_FG_Assignment—Can request hosting Field Group in exclusive edit mode and creates a new Field Group Assignment instance.

Get_All—Can return a table with Field Group Assignment instances associated to the hosting Field Group. Parameter Iv_Request_Before_Image controls, whether the state as existed before start of the current transaction is retrieved.

Get_Field_Group—Can return the hosting Field Group instance.

Get_By_Guid—Static method returns the Field Group Assignment instance for the provided GUID.

Get_Instance—Can return a collection instance for the provided Field Group GUID. Tries to read an existing instance from its static collection instances table and returns it if successful; creates a new instance otherwise. Can raise an exception if Field Group GUID is initial (does not check the existence of the Field Group).

Class Cl_FCL_FG_Assignment extends Cl_FCL_Entity and represents the entity Field Group Assignment. A Field Group Assignment can be locked by the hosting BO Node of the hosting Field Group. The class can use the following example redefined methods:

Get_Edit_Mode—Can return edit mode of hosting Field Group.

Get_Key—Can return GUID.

Get_Persistency—Can return persistency object.

Set_Edit_Mode—Can lock hosting Field Group if exclusive edit mode is requested.

Free—Destructor. Removes itself from collection and calls corresponding method of the superclass.

Its own methods may include:

Constructor—Can set default attributes and adds itself to collection.

Delete—Can delete the Field Group Assignment instance.

Get_Data—Can return the current and before image data.

Class Cl_FCL_FG_Assignment_P extends Cl_FCL_Persistency and is the persistency object (implemented as Singleton) of Field Group Assignment. The constructor of collection Field Group Assignments registers itself at the persistency object—the persistency object can take registered collections into account at the next database select. The class can use the following example redefined methods:

Save—Can update database.

Its own methods may include:

Get_Instance—Can return an instance of the class—creates a new one, if no instance exists yet (Singleton).

Load—Can load the Field Group Assignment instances for the provided Field Group Assignments collection (all Assignments of a Field Group). Calls the Set_Complete-method for the collection.

Load_By_Guids—Can load the Field Group Assignment instances for the provided GUIDs.

Register_Load—Register a collection to take part on next database select.

Unregister_Load—Unregister a collection from taking part on next database select Class Cl_FCL_Functions can extend Cl_FCL_Entity_Collection and is the collection object for Function. It is often responsible to retrieve and create Function instances. The class can use the following example redefined methods:

After_Commit—Performs actions after successful commit work

Free—Destructor. Calls corresponding method of the superclass. Frees member attributes and unregisters from the persistency object, if not yet completed.

Set_Complete—Can set the completion state of the collection

Its own methods may include:

Constructor—Can add reference to itself to buffer of collection instances. If parameter Iv_New is false, registers itself at the persistency object to take part on the next database select.

Create_Function—Can request hosting BO Node in exclusive edit mode and creates a new Function instance.

Get_All—Can return a table with Function instances associated to the hosting BO Node. Parameter Iv_Request_Before_Image controls, whether the state as existed before start of the current transaction is retrieved.

Get_BO_Node—Can return the hosting BO Node instance.

Get_By_Guid—Static method returns the Function instance for the provided GUID.

Get_Instance—Can return a collection instance for the provided BO Node Key. Tries to read an existing instance from its static collection instances table and returns it if successful; creates a new instance otherwise. Can raise an exception if BO Node Key is initial (does not check the existence of the BO Node).

Class Cl_FCL_Function can extend Cl_FCL_Entity and represents the entity Function. It is responsible for operations in FDT. A Function is locked by the hosting BO Node. The class can use the following example redefined methods:

Get_Edit_Mode—Can return edit mode of hosting BO Node.

Get_Key—Can return GUID.

Get_Persistency—Can return persistency object.

Set_Edit_Mode—Can lock hosting BO Node if exclusive edit mode is requested.

Free—Destructor. Removes itself from collection and calls corresponding method of the superclass.

Its own methods may include:

Add_Result_DO—Can add result item to Function in FDT and creates DobjMapping

Check_Consistency—Checks if context and result items in Field Control and FDT are equal and if context items match context of hosting BO Node. Can return a table with aberrances.

Constructor—Can set default attributes and adds itself to collection. If creating a new entity, a Function in FDT is created.

Delete—Can delete the Function instance, FDT Function and corresponding DObjMappings.

Dequeue_FDT_Function—Dequeues Function in FDT

Enqueue_FDT_Function—Can lock Function in FDT

Generate_Decision_Table—Generates decision table for Function in FDT

Get_BO_Name—Can return BO name.

Get_Data—Can return the current and before image data.

Get_Result_Table—Can return table containing proxy names of result Dos.

Get_Top_Expression—Can return ID of top expression of Function in FDT.

Get_URL—Can return URL of function in FDT UI.

Remove_Result_DO—Removes result item from Function in FDT and Can delete DobjMapping.

Repair—Performs steps described in provided table to restore consistency. Note: Rebuild context is typically performed after any other context adjustments, because it expects context items in Field Control and FDT to be consistent. GC_ICTYPE_RE_CONTEXT is therefore defined as 'z' and TY_T_INCONSIST_INFO is a sorted table.

Set_Context—Can set context of the Function in FDT corresponding to context datatype of hosting BO Node.

Set_Software_Component—Can set software component.

Transport_FDT_Function—Writes FDT Function on provided transport request if there is an active version.

Class Cl_FCL_Function_P extends Cl_FCL_Persistency and is the persistency object (implemented as Singleton) of Function. The constructor of collection Functions registers itself at the persistency object—the persistency object takes registered collections into account at the next database select. The class can use the following example redefined methods:

Save—Saves Functions in FDT and can update database and writes FDT Functions on provided transport request.

Its own methods may include:

Get_Instance—Can return an instance of the class—creates a new one, if no instance exists yet (Singleton).

Load—Can load the Function instances for the provided Functions collection (all Functions of a BO Node). Calls the Set_Complete-method for the collection. Load_By_Guids—Can load the Function instances for the provided GUIDs.

Register_Load—Register a collection to take part on next database select.

Unregister_Load—Unregister a collection from taking part on next database select Class Cl_FCL_DObjMappings extends Cl_FCL_Entity_Collection and is the collection object for DObjMapping. It is responsible to retrieve and create DObjMapping instances. The class can use the following example redefined methods:

After_Commit—Performs actions after successful commit work

Free—Destructor. Calls corresponding method of the superclass. Frees member attributes and unregisters from the persistency object, if not yet completed.

Set_Complete—Can set the completion state of the collection

Its own methods may include:

Constructor—Can add reference to itself to buffer of collection instances. If parameter Iv_New is false, registers itself at the persistency object to take part on the next database select.

Create_DObjMapping—Can request hosting Function in exclusive edit mode and creates a new DObjMapping instance.

Get_All—Can return a table with DObjMapping instances associated to the hosting Function. Parameter Iv_Request_Before_Image controls, whether the state as existed before start of the current transaction is retrieved.

Get_By_Guid—Static method returns the DObjMapping instance for the provided GUID.

Get_Function—Can return the hosting Function instance.

Get_Instance—Can return a collection instance for the provided Function GUID. Tries to read an existing instance from its static collection instances table and returns it if successful; creates a new instance otherwise. Can raise an exception if Function GUID is initial (does not check the existence of the Function).

Class Cl_FCL_DObjMapping extends Cl_FCL_Entity and represents the entity DObjMapping. It is responsible for the mapping of a GUID in FDT to an element name. A DObjMapping is locked by the hosting BO Node of the hosting Function. The class can use the following example redefined methods:

Get_Edit_Mode—Can return edit mode of hosting Function.

Get_Key—Can return GUID.

Get_Persistency—Can return persistency object.

Set_Edit_Mode—Can lock hosting Function if exclusive edit mode is requested.

Free—Destructor. Removes itself from collection and calls corresponding method of the superclass.

Its own methods may include:

Constructor—Can set default attributes and adds itself to collection.

Delete—Can delete the DObjMapping instance.

Get_Data—Can return the current and before image data.

Set_Data—Can set basic data.

Class Cl_FCL_DObjMapping_P extends Cl_FCL_Persistency and is the persistency object (implemented as Singleton) of DObjMapping. The constructor of collection DObjMappings registers itself at the persistency object—the persistency object takes registered collections into account at the next database select. The class can use the following example redefined methods:

Save—Can update database.

Its own methods may include:

Get_Instance—Can return an instance of the class—creates a new one, if no instance exists yet (Singleton).

Load—Can load the DObjMapping instances for the provided DObjMappings collection (all DObjMappings of a Function). Calls the Set_Complete-method for the collection.

Load_By_Guids—Can load the DObjMapping instances for the provided GUIDs.

Register_Load—Register a collection to take part on next database select.

Unregister_Load—Unregister a collection from taking part on next database select It will be understood that the foregoing class, method, field, and other programming description is for example purposes only. In other words, other implementations may use other programming languages (object oriented or no), as well as other programming structures, functionality organizations, and data structures.

Returning to illustrated FIG. 1, network 104 facilitates wireless or wireline communication between computer server 102 and any other local or remote computer, such as clients 106. Network 104 may be all or a portion of an enterprise or secured network. In another example, network 104 may be a VPN merely between server 102 and client 106 across wireline or wireless link. Such an example wireless link may be via 802.11a, 802.11b, 802.11g, 802.20, WiMax, and many others. While illustrated as a single or continuous network, network 104 may be logically divided into various sub-nets or virtual networks without departing from the scope of this disclosure, so long as at least portion of network 104 may facilitate communications between server 102 and at least one client 106. In other words, network 104 encompasses any internal or external network, networks, sub-network, or combination thereof operable to facilitate communications between various computing components in system 100. Network 104 may communicate, for example, Internet Protocol (IP) packets, Frame Relay frames, Asynchronous Transfer Mode (ATM) cells, voice, video, data, and other suitable information between network addresses. Network 104 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 104 may be a secure network associated with the enterprise and certain local or remote clients 106.

Client 106 is any computing device operable to connect or communicate with server 102 or network 104 using any communication link. At a high level, each client 106 includes or executes at least GUI 124 and comprises an electronic computing device operable to receive, transmit, process and store any appropriate data associated with system 100. It will be understood that there may be any number of clients 106 communicably coupled to server 102. Further, "client 106," "business," and "user" may be used interchangeably as appropriate without departing from the scope of this disclosure. Moreover, for ease of illustration, each client 106 is described in terms of being used by one user. But this disclosure contemplates that many users may use one computer or that one user may use multiple computers. In certain situations, users may include software developers, software architects, or others tasked with developing, configuring or customizing the system 100. For the developer, system 100 may provide or make available, for example through client 106 and settings engine 122: i) a list of business objects 112; ii) details of a specific business object 112 (name, business client, extensions, a list of configured fields and associated properties); and iii) a method of adjusting the properties of a given field.

GUI 124 comprises a graphical user interface operable to allow the user of client 106 to interface with at least a portion of system 100 for any suitable purpose, such as viewing application or other transaction data. Generally, GUI 124 provides the particular user with an efficient and user-friendly presentation of data provided by or communicated within system 100. As shown in later figures, GUI 124 may comprise a plurality of customizable frames or views having interactive fields, pull-down lists, and buttons operated by the user. For example, GUI 124 is operable to display certain fields 126 in a user-friendly form based on the user context and the displayed data. GUI 124 is often configurable, supporting a combination of tables and graphs (bar, line, pie, status dials, etc.), and is able to build real-time dashboards, where fields 126 (as well the displayed application or transaction data) may be displayed, relocated, resized, and such. GUI 124 may represent a front-end of the rules engine that allows developers or other users to manage the field control registry, such as at design time. For example, such development or management may include some or all of the following steps, as well as other steps.

1. Call transaction to register the appropriate business object 121 in a field control registry in memory 108.
   a. Choose the correct caller:
   b. Choose a business object (proxy name) via the entry help.
   c. Register a BO Node by leaving an Extension field blank. To extend an already registered BO Node, then an extension name can be entered and skip to step 4. Extensions can use the same context and be automatically processed at runtime.
2. Double click on the BO Node to be registered in the upcoming tree. Already registered BO Nodes have a green icon. If a BO node is selected that does not exist yet, GUI 124 may prompt the developer to create it.
3. Enter a data structure that can be used as context for this BO Node. The fields of the context structure are the possible conditions within the functions in the Formula & Derivation Tool. The value for the context is typically provided at runtime when calling Field Control. If the indicator "Affected by Locks" is set the parameter IV_LOCK_STATE can be considered at runtime. Field Control can then set the properties according to the lock state automatically. For example, if the lock state is '0' (read-only) the following properties can be set:
   Node Properties: update_enabled=false; delete_enabled=false
   All associations from this node to create_enabled=false
   All actions of this node to enabled=false
4. To create functions (rules) for dynamic field/action/association/node properties double click on the corresponding node in the tree.
5. Mark result items to add in the right table and click on the upper arrow to add them to the function. For field properties result items are the available attributes of a BO node, for association properties the existing associations of a node, for action properties the existing actions, and for node properties the fixed values "update" and "delete". For each result, item property values can be set in the generated functions in depending on the context.
6. A Generate Decision Table button or graphical element may be pressed, clicked, or selected to create a decision table and assign it as top-expression to the function. Context fields and the result are part of the decision table per default. The developer can often easily remove unwanted context elements from the decision table easily in UI in the decision table's settings. In some cases, the decision table may be generated to use a decision table as top expression.
7. To create field groups right click on the "field groups" folder and select Create New Field Group in the context menu.
8. Enter a name and a description for the new field group in the upcoming popup.
9. Mark field items to assign to the field group in the right table and click on the upper arrow to add them.
10. To generate a decision table, the developer may click on the Generate Decision Table graphical element.
11. The GUI 124 may then allow the developer to save his settings.
12. After maintaining the content of the functions in UI, related objects can be written on a transport request using the "Transport Functions" button.
The developer may also check consistency. If there are any inconsistencies, it is possible to repair them automatically. The developer can further check and activate the changed function in the UI 124 afterwards. It may also be possible to test or simulate the registered BO Nodes by, for example, entering context values and executing the simulation.

It may be understood that the term graphical user interface may be used in the singular or in the plural to describe one or more graphical user interfaces and each of the displays of a particular graphical user interface. Indeed, reference to GUI 124 may indicate a reference to the front-end or a component of settings engine 122, as well as the particular interface accessible via client 106, as appropriate, without departing from the scope of this disclosure. Therefore, GUI 124 contemplates any graphical user interface, such as a generic web browser or touchscreen, that processes information in system 100 and efficiently presents the results to the user. Server 102 can accept data from client 106 via the web browser (e.g., Microsoft Internet Explorer or Netscape Navigator) and return the appropriate HTML or XML responses to the browser using network 104.

Figure 2A:
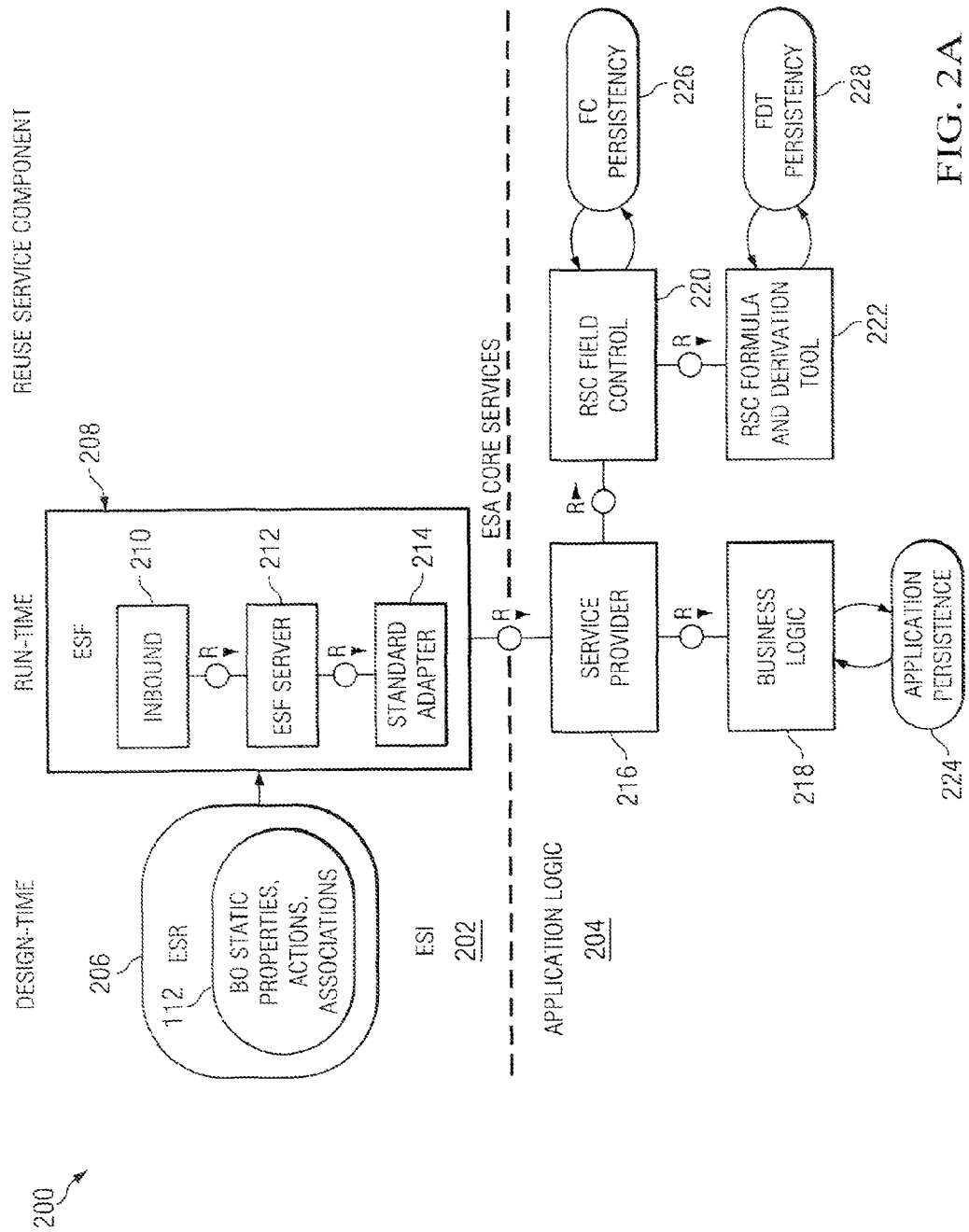
FIGS. 2A-B illustrate example architectures for the system of FIG. 1.

FIG. 2A illustrates an exemplary architecture 200 implementing various processes and modules in accordance with one embodiment of the system 100 of FIG. 1. The illustrated architecture 200 is divided into an enterprise service infrastructure (ESI) part 202 and an application logic part 204. The ESI 202 may contain an enterprise service repository (ESR) 206 that may be configured when the system is designed, and an enterprise service framework (ESF) 208 that may operate at run-time. The ESR 206 may contain one or more business objects 112, along with associated static properties, actions and associations. The ESF 208 may contain a module for managing incoming messages 210, an ESF server module 212, and/or a standard adapter module 214 for managing outgoing messages. At run-time, the ESF 208 may load the business objects 112 stored in the ESR 206.

The application logic part 204 may contain a service provider module 216, a business logic module 218, a reuse service component field control (FC) 220, and a reuse service component formula and derivation tool (FDT) 222. The business logic 218 may be associated with an application persistence module 224. The FC module 220 may be associated with an FC persistency module 226. The FDT 222 may be associated with an FDT persistency module 228.

Request received by the inbound module 210 may be transformed. The Request may be passed, with or without transformation to the ESF server module 212. At runtime, the ESF server module 212 may prepare the request for processing by the application logic 204. The preparation may include attaching a business object 112, along with its static properties to the request. The request prepared by the ESF server module 212 may be passed to the standard adapter 214. The standard adapter 214 may prepare the request for output. The ESF 208 may pass the request to the service provider module 216 of the application logic part 204.

Within the application logic 204, the service provider 216 may request that the RSC field control 220 determine the properties for fields in the business object 112. The RSC field control 220 may query its persistency module 226 for layer and hierarchy information, compare that information with the static properties that may be contained within the business object 112, and from them determine the properties. The RSC field control 220 may also request dynamic properties from the FDT 222, and compare the dynamic properties to the static properties. The resulting properties returned to the service provider 216 may be the most restrictive values. The service provider 216 may also pass the request to the business logic module 218. The business logic module 218 may perform any additional logic steps that may be requested.

Though the components of the illustrated architecture 200 are presented as separate components communicably linked though programmatic interfaces, it will be understood that the components may be variously combined in one or more other components without departing from the scope of this disclosure. Further it will be understood that architecture 200 may also contain various other components for implementing various undisclosed features.

Figure 2B:
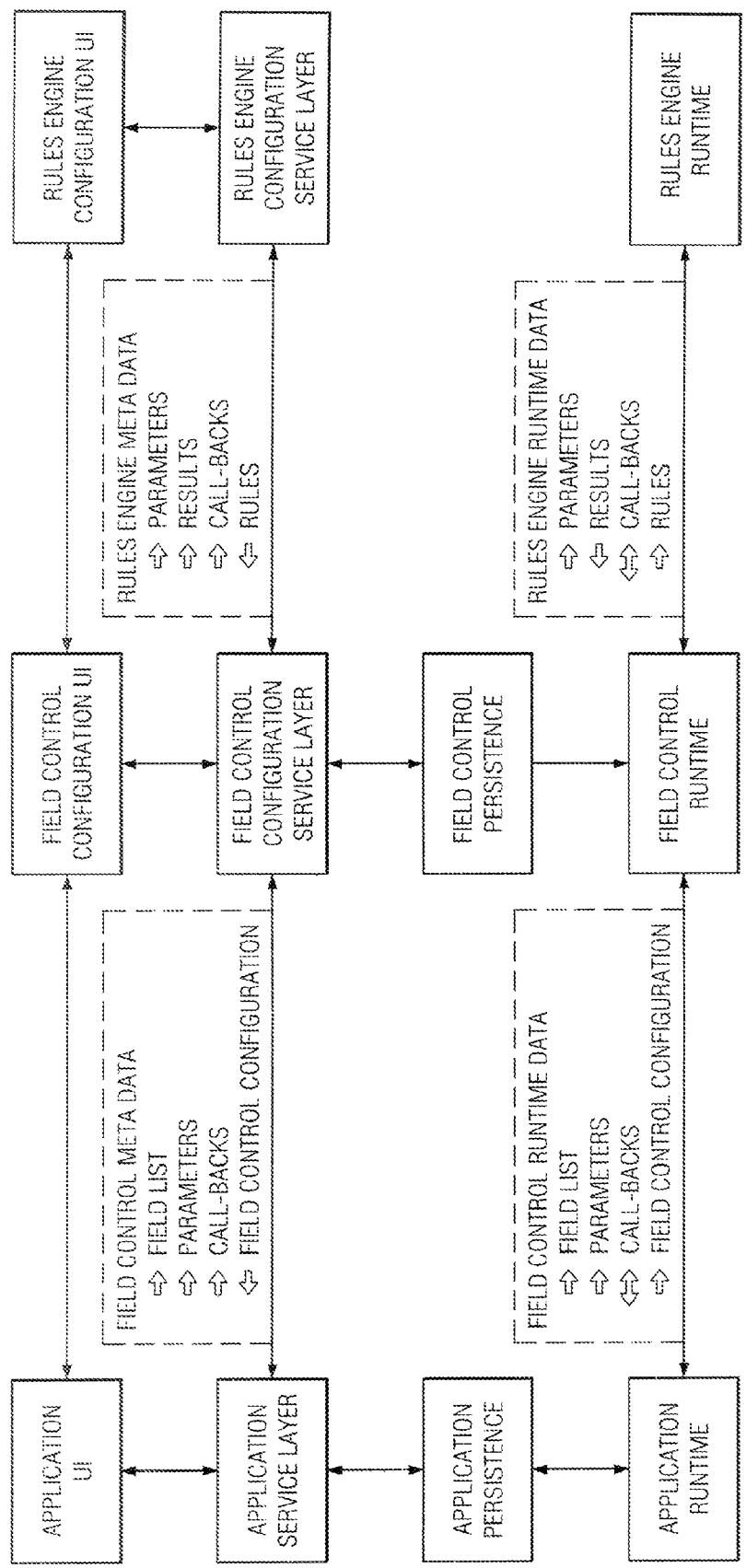

For example, turning to FIG. 2B, the illustrated architecture comprises multiple layers, namely:

UI for configuration
Service Layer, mainly consisting of services to access metadata
Persistence Layer
Runtime Layer The field Control UI can usually be called directly from the application UI. It includes the rules engine UI. In case the application needs to access the field control metadata directly, it can call the field control service layer. The field control service layer uses the rules engine service layer to access the rules created with the rules engine UI. The field control metadata is also translated into rules. Thus, the logic needed to execute the field control configuration can be compiled into the respective software by the rules engine. Field list, parameters and call-backs can be either specified using the field control UI or service layer. In this scenario, the rules engine does not use its own persistence layer. Instead, the rules engine metadata is a part of the field control metadata. The field control metadata can be stored by the field control persistence, by the application (usually together with some application object, and so forth. During runtime, the application may call the field control runtime and passes the field list, parameters, and the metadata (if the persistence is done by the application) or the metadata key (if the persistence is done by field control itself). The field control runtime calls the rules engine runtime, which calls the generated coding. In some cases, the field control follows the Vienna standards for extendibility. Also, default field attributes can be valid for customer extensions.

The metadata may associated with profiles, field control records, field control attributes, allowed flags, rules, and layers. Profiles generally store configuration and there may be at least one profile for each field list. But if the field attributes are very different for the same field list, more profiles can be used to make configuration easier. The example Rules Engine can be used for profile determination (often via separate call by the application). Each application can register for the field control service and receive a unique name-space. The profile can be unique by application, so the application has control over the profile name. The profile includes field control records. There can be one field control record for each entry in the field list. If there is none, the default field attribute "Changeable" may be used. The field control records may store data such as unique field name from the field list as primary key (e.g. by adding the BO-Node to the field name), field control attribute, allowed flags, rules, layer, or other suitable information. Example values of a field control attribute includes "not relevant," "read-only," "changeable," and "mandatory". In other implementations, the information is often distributed over multiple attributes (e.g. hidden, changeable, and mandatory flags). Allowed flags may control the field attributes that are allowed. This is checked during configuration and runtime. In a multi-layer configuration, outer layers may be the ones to remove allowed flags. Rules can be maintained or managed using the rules engine. For example, field control creates the parameters and results for the rules engine and helps ensure that the rules follow the restrictions set by the allowed flags. There can be multiple layers, such as maintenance layer, for the software provider, partners or the customers. Generally, configuration from outer layers replaces the configuration from inner layers. In some implementations, the field control attribute are set to values by the inner layers and allowed flags are removed by outer layers.

Figures 3, 4:
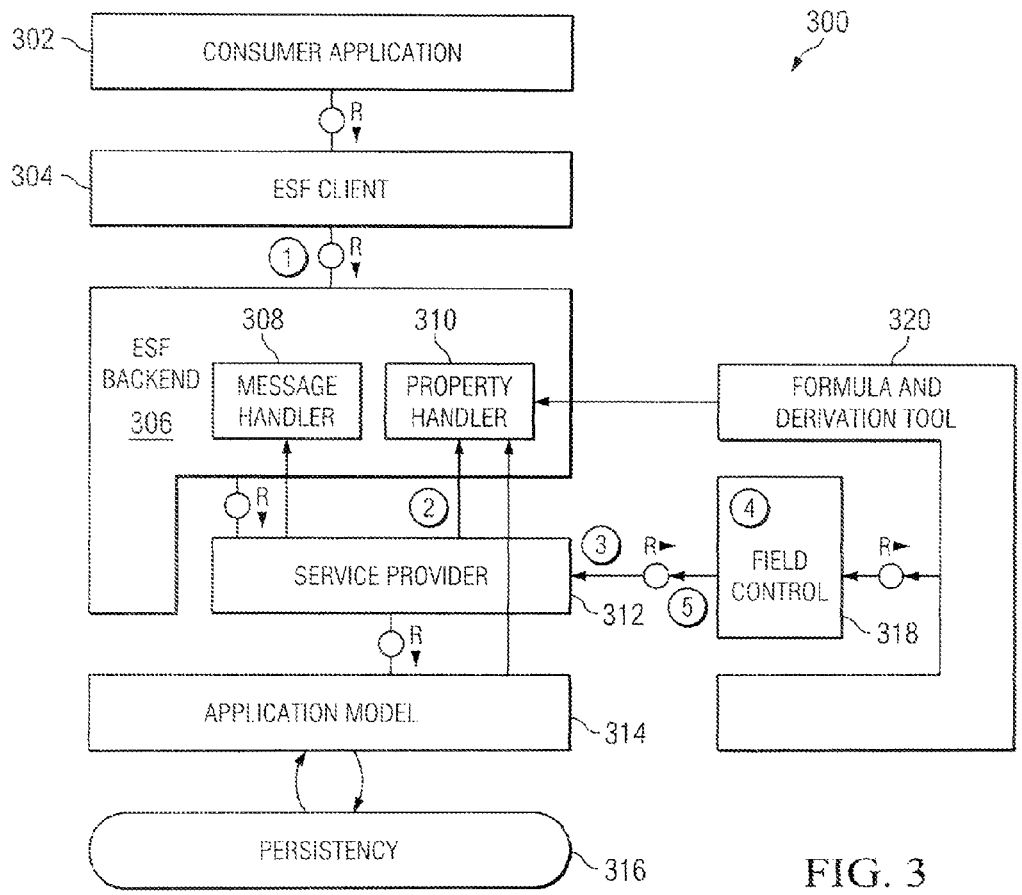
FIG. 3 illustrates another example architecture for the system of FIG. 1.
FIG. 4 illustrates an example user interface for configuring properties for fields in the SOA environment.

FIG. 3 illustrates an architecture 300 for another embodiment of the example system of FIG. 1. In the illustrated embodiment, a consumer application 302 may include or be communicably coupled with an enterprise service framework (ESF) client 304. The ESF client 304 may be communicably coupled to an ESF backend 306. The ESF backend 306 may contain a message handler 308 and/or a property handler 310. The ESF backend 306 may contain or be communicably coupled to a service provider 312, which in turn may contain or be coupled to an application model 314. The application model 314 may contain or be connected to a persistency module 316. The illustrated service provider 312 may also contain or be connected to a field control (FC) 318. The FC 318 may be coupled to a formula and derivation tool (FDT) 320.

In the illustrated architecture 300, there are two example points in time when FC 318 can be called in run-time. An exemplary function of the FC 318, descriptively named "retrieve_fc_properties," may be called in run-time to retrieve the run-time properties of the field of the business object 112. During execution, the exemplary FC function may push the declarative dynamic properties defined in FDT 320 into the ESF property handler 310. The Service Provider 312 may call FC 318 within this method to ensure considering the configuration of superior layers. The handling for locks that may not be obtained for a business object node may be implemented by the service providers 312.

The ESF backend 306 may implement a set of functions for managing data flow in the inbound and outbound directions. These functions may be accessed by the ESF client 304. For example, inbound functions named "modify" and "check_before_save" may be implemented in the ESF backend 306 to accept data from the ESF client 304, and outbound functions named "retrieve" and "retrieve by association" may be implemented to provide data to the ESF client 304. These exemplary functions may be collectively called "core service functions" to indicate that they are functions of the ESF backend 306.

The exemplary core service functions modify and check_before_save (inbound data) may be called by the ESF client 304 in run-time. FC 308 may provide a method to check the observance of field properties defined within the FDT 320. In one embodiment this method may be called "check_field_properties". The same rules may be processed for the inbound and outbound cases.

For the outbound data the FC 318 may determine the properties for fields, actions and associations of a business object node. If the FC 318 detects that no properties are maintained for the node it is possible that nothing will be done here and no performance lost. For the inbound direction (modify) FC 318 may provide a method to check the observance of field properties against updated field values (check_field_properties). The implementation of these checks may be done in the service provider 312, but is optional. The service provider 312 may also decide when to check the data. In some situations the service provider 312 may check the properties within exemplary core service function modify, in other situations the service provider 312 may check the properties within exemplary core service function check_before_save.

The exemplary check_field_properties method of the FC 318 may return a list of fields and properties with violations to evaluated field properties. The calling application may decide how to react. Regarding action and association properties, it may also be possible to evaluate the current properties at inbound direction. Applications may check if calling an action or association is permitted.

For example, the following steps may be performed for data moving in the outbound direction, during operation of the example core service functions retrieve and retrieve_by_association:

In step 1, an ESF Client 304 may call a core service method of the ESF backend 306 such as exemplary functions retrieve or retrieve_by_association;

In step 2, the service provider 312 may fill the property handler 310 (e.g. a BO node could not be locked or other complex conditions that are coded in the service provider 312 or application model 314);

In step 3, the service provider may call FC 318 via method "fill_fc_properties" to consider declarative rules defined by the software developer; and In step 4, FC 318 may determine the properties in FDT 320 and may fill the property handler 310. There may be no reconciliation with the current properties of the property handler 310.

Continuing the example, the following steps may be performed for data moving in the inbound direction during operation of the example core service functions modify and check_before_save:

In step 1, the ESF Client 304 may call a core service method of the ESF backend 306 such as exemplary core service functions modify or check_before_save; and In step 5, the service provider 312 may call FC 318 to check the incoming or saving data against the current field properties.

Applications may also handle the properties in coding. This may be done both in the service provider 312 at BO level and in the application model 314.

FC 318 may be called in the outbound direction to consider the configuration of superior layers and the properties of extensible fields if the scope of FC 318 is extended. For the layer provided by the software developer the properties that are defined in FDT 320 may have the same character like coding. If the application 314 fills the property handler 310 and FC 318 is called afterwards the properties may be overwritten if the same fields are handled in both coding and FDT 320. For superior layers FC 318 may consider the field properties that are already pushed into the property handler 310 and may allow more restrictive redefinitions.

FIG. 4 illustrates a sample user interface 400 for configuring properties for fields of business objects 112 in the ESA environment. In the illustrated interface 400, each field of a business object 112 in a given layer is presented in a row of a table. The business object 112 may be identified by entries in the columns 402 and 404 labeled "BO" and "BO Node" respectively. The field of the business object 112 may be identified by the column 406 labeled "Field Name". The layer in which the properties of the fields of the business object 112 are stored may be presented in the column 408 labeled "Layer". A set of values in the BO, BO Node, Field Name, and Layer columns 402, 404, 406, 408 may uniquely identify a row in the table. In the illustrated interface 400 the properties are represented by a set of Boolean variables. Check boxes 410 for changing the Boolean variables are presented in columns 412, 414, 416 labeled "Enabled", "Read-Only", and "Mandatory" respectively. The column 418 labeled "Rule" may contain an indication of whether a property for the field is static or dynamic. In the illustrated interface 400, a folder icon 420 indicates that the property is static, and a pointing finger icon 422 indicates that the property is dynamic.

Figure 5:
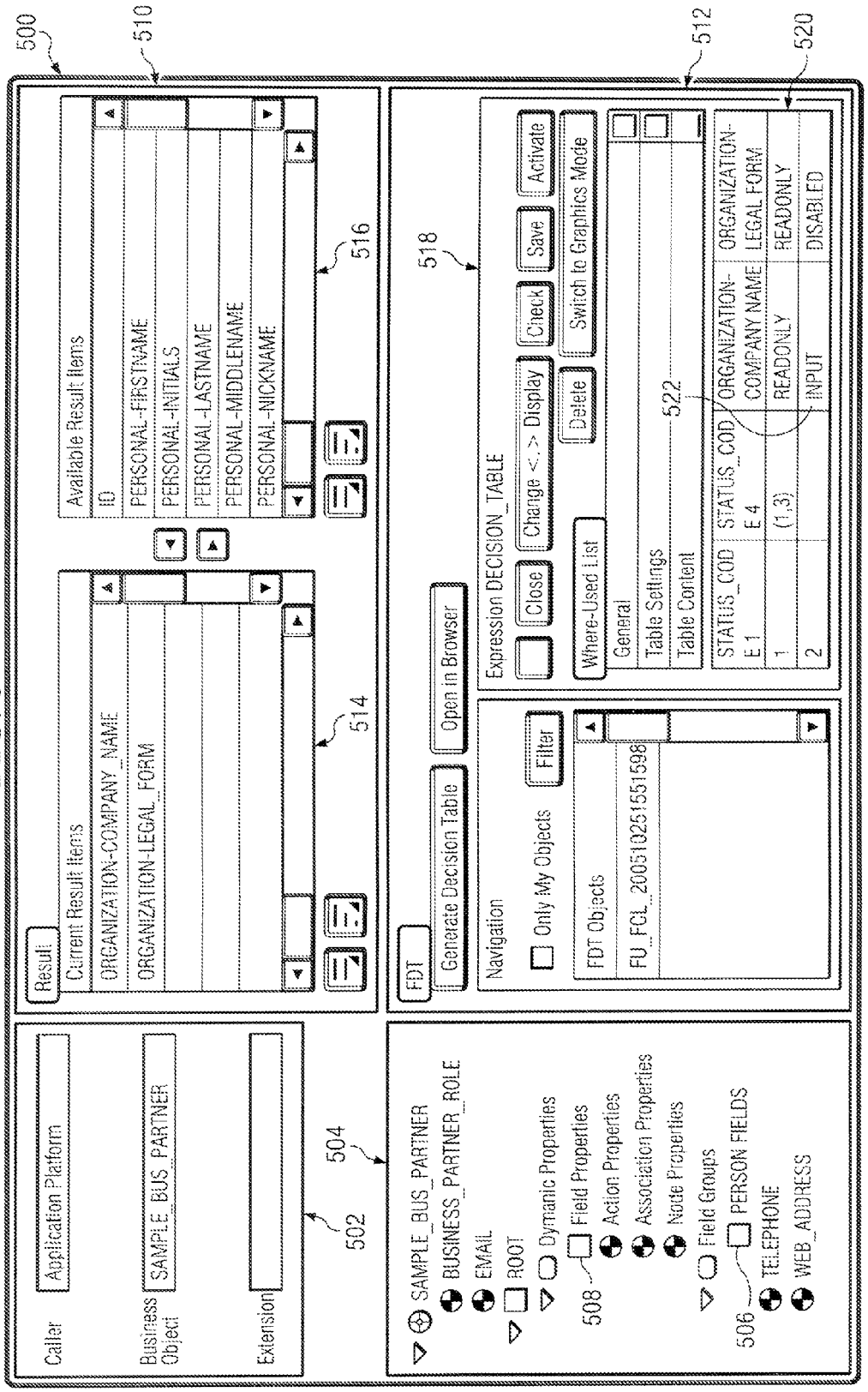
FIG. 5 illustrates a second example user interface for configuring properties for fields in the SOA environment.

FIG. 5 illustrates a second exemplary user interface 500 for configuring properties of fields of a business object in the ESA environment. The first section 502, shown in the upper left corner of the illustrated interface 500, contains controls for entering the caller, business object, and extension. In some embodiments the caller may be the same as the layer, described in detail above. The second section 504, shown in the lower left of the illustrated user interface 500 contains details of the business object selected in the first section 502. Field groups 506, may be created, managed and deleted in the section 504. Selecting the Field Properties 508 may cause additional sections to be shown, such as section 510 shown in the upper right of the illustrated user interface 500, and section 512 shown in the lower right of the illustrated user interface 500. Section 512 may contain separate lists 514 and 516, which in this example represent selected fields of the business object, and unselected fields of the business object respectively. The section 514 in the exemplary user interface 514 represents an embedded exemplary user interface to the formula and derivation tool (FDT) 320 of FIG. 3. Among other controls, the section 514 contains a decision table 518. The decision table contents 520 may contain columns for the items in the selected fields list 514 of section 510. Field properties may be changed by changing the values contained within a cell 522 of the decision table.

Figure 6:
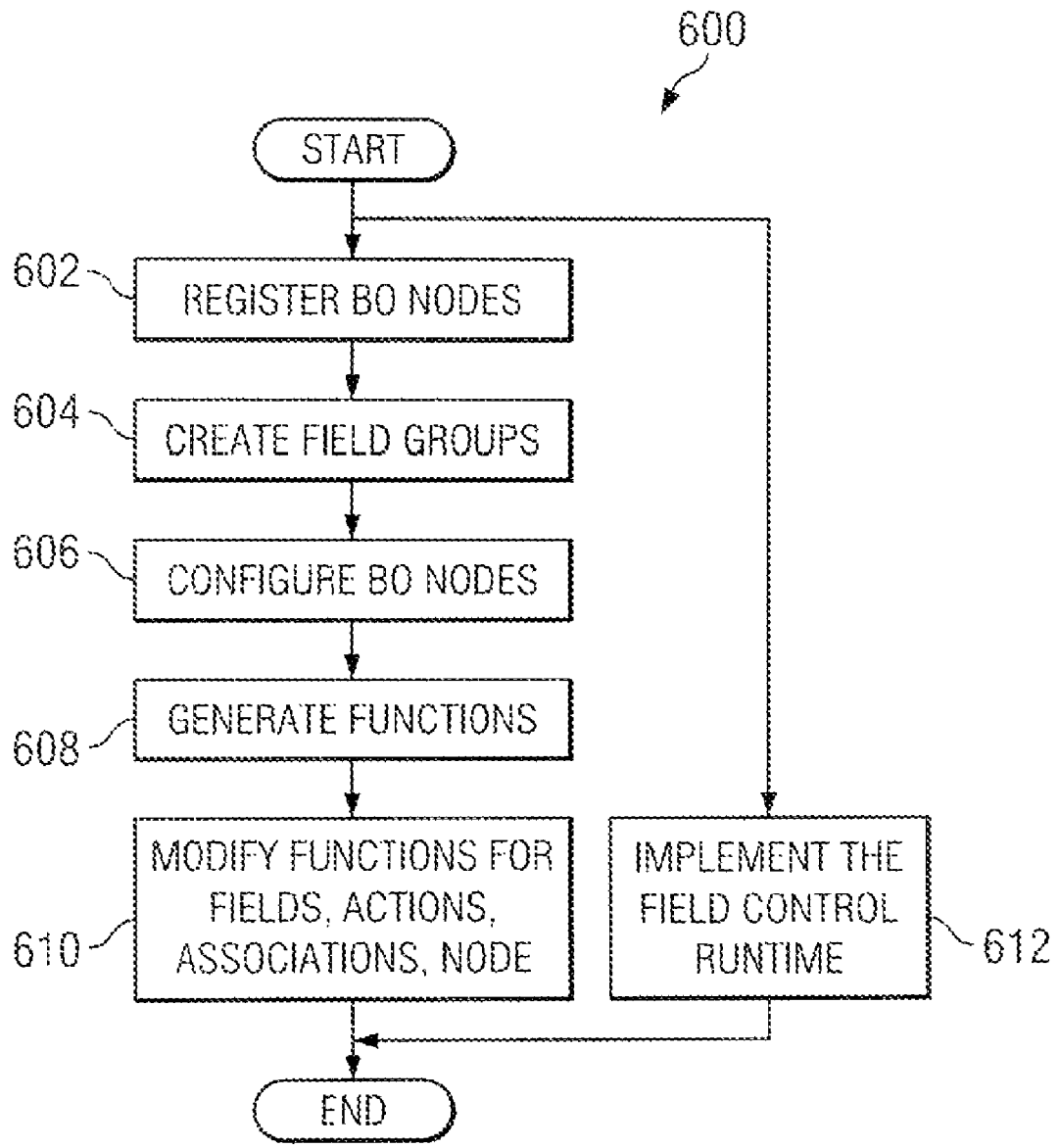
FIG. 6 illustrates an example process flow for configuring properties for fields in an SOA environment.

FIG. 6 illustrates an exemplary process flow for configuring properties for fields of a business object in an ESA environment. In step 602, the server 102 may receive a request from a user to register the business object nodes, and may perform said registration. The user may be interacting with a user interface 124 such as the exemplary user interface 500 of FIG. 5.

In step 604, the server 102 may receive an optional request from the user to create a field group, and may create said field group. The server may also send the newly created field group to a persistency module, such as the FC persistency module 226 of FIG. 2. In step 606, the server may receive a request from the user to configure the BO Nodes that were registered in step 602, and may perform said configuration. The configuration may consist of setting the properties for the fields of the BO Nodes. The server may also send the configuration to a persistency module.

In step 608, the server 102 may receive a request from the user to generate functions in the formula and derivation tool and may perform said generation. In step 610, the server may receive a request from the user to modify the functions created in step 608, and may perform said modification. The modification may take place within the context of the formula and derivation tool. The modification may consist of creating code for generating dynamic properties based upon other properties of the fields of the business object. The dynamic properties may also be based upon the properties of fields of a different business object, or other conditions. The server may send the modifications to a persistency module, such as the FDT persistency module 228 of FIG. 2A. In step 612, the client 106 may implement the Field Control Runtime within the software for a service provider, such as the service provider 216 of FIG. 2.

It will be understood that the foregoing methods are for illustration purposes only and that the described or similar processes and techniques may be performed at any appropriate time, including concurrently, individually, or in combination. In addition, many of the steps in this disclosure may take place simultaneously and/or in different orders than as shown. For example, step 612 may occur before, after, or at the same time as steps 602 through 610. Moreover, system 100 may use or implement similar methods with additional steps, fewer steps, and/or different steps, so long as the methods remain appropriate.

A number of embodiments of the invention have been described. Nevertheless, it will be understood that various modifications may be made without departing from the spirit and scope of the invention. For example, the field control may operate independently of the formula and derivation tool, rather than in concert with it. Accordingly, other embodiments are within the scope of the following claims.

What is claimed is:

1. A computer implemented method for dynamically modifying a business object property in a Service Oriented Architecture (SOA) comprising:
    receiving, at a server, an initial request for a user interface associated with a business object, the user interface including a plurality of fields presented through a first client, each field dynamically assigned a property from a plurality of predefined properties based on a first business context for the business object and at least one predefined rule, each of the plurality of predefined properties assigns a different level that a user interacts with the assigned field;
    transmitting the requested user interface to the first client for presentation, a user of the first client interacts with each of the plurality of fields in accordance with the assigned property;
    receiving a subsequent request for the user interface from a second client, the subsequent request identifying a second business context for the business object different from the first business context;
    dynamically assigning a property for each of the plurality of fields from the plurality of predefined properties based, at least in part, on the second business context and the at least one predefined rule, the property for each of the plurality of fields assigns an interactivity level different than interactivity levels of the plurality of fields transmitted to the first client; and
    automatically transmitting to the second client the user interface including interactivity levels different from the interactivity levels of the plurality of fields transmitted to the first client.

2. The method of claim 1 further comprising:
    identifying at least one action associated with the business object; and
    dynamically modifying at least one of the fields of the interface based, at least in part, on the at least one action associated with the business object.

3. The method of claim 1 further comprising:
    identifying a current status of an association of the business object with a different object; and
    dynamically modifying at least one of the fields of the interface based, at least in part, on the current status of the association.

4. The method of claim 1, the one or more attributes of business object comprising at least one of a status of the business object, the first client, or a software layer associated with the request.

5. The method of claim 1, wherein dynamically modifying at least one of the fields comprises automatically deleting at least one of the fields in response to at least one or more of the current values.

6. The method of claim 1, the request associated with a first software layer and the method further comprising:
    identifying settings of the plurality of fields associated with a second software layer; and
    determining whether the request from the first software layer violates the settings associated with the second software layer.

7. The method of claim 6 further comprising, in response to the request violating at least one of the settings associated with the second software layer, transmitting the interface including the at least one of the settings associated with the second software layer to the first software layer.

8. Software for dynamically modifying a business object property in a Service Oriented Architecture (SOA) comprising computer readable instructions embodied on media and operable when executed to:
    receive, at a server, an initial request for a user interface associated with a business object, the user interface including a plurality of fields presented through a first client, each field dynamically assigned a property from a plurality of predefined properties based on a first business context for the business object and at least one predefined rule, each of the plurality of predefined properties assigns a different level that a user interacts with the assigned field;
    transmit the requested user interface to the first client for presentation, a user of the first client interacts with each of the plurality of fields in accordance with the assigned property;
    receive a subsequent request for the user interface from a second client, the subsequent request identifying a second business context for the business object different from the first business context;
    dynamically assign a property for each of the plurality of fields from the plurality of predefined properties based, at least in part, on the second business context and the at least one predefined rule, the property for each of the plurality of fields assigns an interactivity level different than interactivity levels of the plurality of fields transmitted to the first client; and
    automatically transmit to the second client the user interface including interactivity levels different from the interactivity levels of the plurality of fields transmitted to the first client.

9. The software of claim 8 further operable to:
    identify at least one action associated with the business object; and
    dynamically modify at least one of the fields of the interface based, at least in part, on the at least one action associated with the business object.

10. The software of claim 8 further operable to:
    identify a current status of an association of the business object with a different object; and
    dynamically modify at least one of the fields of the interface based, at least in part, on the current status of the association.

11. The software of claim 8, the one or more attributes of the business object comprising at least one of a status of the business object, the first client, or a software layer associated with the request.

12. The software of claim 8, wherein dynamically modifying at least one of the fields comprises automatically deleting at least one of the fields in response to at least one or more of the current values.

13. The software of claim 8, the request associated with a first software layer and the software further operable to:
    identify settings of the plurality of fields associated with a second software layer; and determine whether the request from the first software layer violates the settings associated with the second software layer.

14. The software of claim 13 further operable to, in response to the request violating at least one of the settings associated with the second software layer, transmit the interface including the at least one of the settings associated with the second software layer to the first software layer.

15. A system for dynamically modifying a business object property in a Service Oriented Architecture (SOA) comprising:
   means for receiving, at a server, an initial request for a user interface associated with a business object, the user interface including a plurality of fields presented through a first client, each field dynamically assigned a property from a plurality of predefined properties based on a first business context for the business object and at least one predefined rule, each of the plurality of predefined properties assigns a different level that a user interacts with the assigned field;
   means for transmitting the requested user interface to the first client for presentation, a user of the first client interacts with each of the plurality of fields in accordance with the assigned property;
   means for receiving a subsequent request for the user interface from a second client, the subsequent request identifying a second business context for the business object different from the first business context;
   means for dynamically assigning a property for each of the plurality of fields from the plurality of predefined properties based, at least in part, on the second business context and the at least one predefined rule, the property for each of the plurality of fields assigns an interactivity level different than interactivity levels of the plurality of fields transmitted to the first client; and
   means for automatically transmitting to the second client the user interface including interactivity levels different from the interactivity levels of the plurality of fields transmitted to the first client.

16. The system of claim 15 further comprising:
   means for identifying at least one action associated with the business object; and
   means for dynamically modifying at least one of the fields of the interface based, at least in part, on the at least one action associated with the business object.

17. The system of claim 15 further comprising:
   means for identifying a current status of an association of the business object with a different object; and
   means for dynamically modifying at least one of the fields of the interface based, at least in part, on the current status of the association.

18. The system of claim 15, the one or more attributes of the business object comprising at least one of a status of the business object, the first client, or a software layer associated with the request.

19. The system of claim 15, the request associated with a first software layer and the system further comprising:
   means for identifying settings of the plurality of fields associated with a second software layer; and
   means for determining whether the request from the first software layer violates the settings associated with the second software layer.

20. The system of claim 19, in response to the request violating at least one of the settings associated with the second software layer, further comprising means for transmitting the interface including the at least one of the settings associated with the second software layer to the first software layer.

* * * * *